(12) United States Patent
Sakurai

(10) Patent No.: US 9,720,168 B2
(45) Date of Patent: Aug. 1, 2017

(54) WAVELENGTH SELECTIVE OPTICAL SWITCH HAVING SPECIFIED CHARACTERISTICS OF WDM SIGNAL LIGHT BEAM

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 454 days.

(21) Appl. No.: 13/938,506

(22) Filed: Jul. 10, 2013

(65) Prior Publication Data

US 2014/0072257 A1 Mar. 13, 2014

(30) Foreign Application Priority Data

Sep. 11, 2012 (JP) .................... 2012-199170

(51) Int. Cl.
- *G02B 6/10* (2006.01)
- *G02B 6/27* (2006.01)
- *G02B 6/293* (2006.01)
- *G02F 1/31* (2006.01)

(52) U.S. Cl.
CPC ............ *G02B 6/105* (2013.01); *G02B 6/272* (2013.01); *G02B 6/29311* (2013.01); *G02F 1/31* (2013.01); *G02B 6/2793* (2013.01); *G02F 2201/305* (2013.01)

(58) Field of Classification Search
CPC ... G02B 6/26; G02B 6/34; G02B 6/35; G02B 6/354; G02B 6/12007; G02B 26/08; G02B 26/0875; G02B 26/0883; G02F 1/13; G02F 1/31; G02F 1/1326; G02F 1/136

USPC ............ 345/55, 84, 87, 103, 104; 349/1, 18, 349/193, 196; 359/237, 483.01, 484.06, 359/485.01–485.06, 487.01, 487.04, 359/489.01, 489.08–489.13; 385/4, 11, 385/15, 16

See application file for complete search history.

(56) References Cited

U.S. PATENT DOCUMENTS

| | | | |
|---|---|---|---|
| 5,696,859 A * | 12/1997 | Onaka ................ | G02B 6/12007 372/20 |
| 6,707,959 B2 | 3/2004 | Ducellier et al. | |
| 7,162,115 B2 | 1/2007 | Brophy et al. | |
| 7,397,980 B2 | 7/2008 | Frisken | |
| 7,787,720 B2 | 8/2010 | Frisken et al. | |

(Continued)

*Primary Examiner* — Bumsuk Won
*Assistant Examiner* — Ryan S Dunning
(74) *Attorney, Agent, or Firm* — Osha Liang LLP

(57) ABSTRACT

A wavelength selective optical switch includes a light input/output unit having a plurality of input/output ports, a polarization plane-independent wavelength dispersion element that splits incident light input from the optical input/output unit into spatially different angles for each wavelength, and synthesizes emergent light from different directions and outputs the light to the optical input/output unit, a condenser element that condenses the light split by the wavelength splitting element, a polarization splitter that splits incident light incident via the condenser element according to a polarization component to result in first and second light beams, aligns a polarization direction by rotating a polarization direction of one of the beams, and synthesizes the incident light by rotating one polarization direction of the emergent light of the same wavelength among the first and second reflected light beams, and a space phase modulation element.

11 Claims, 13 Drawing Sheets

(56) References Cited

U.S. PATENT DOCUMENTS

2002/0172451 A1* 11/2002 Gupta .................... G02B 6/32
                                                      385/16
2006/0067611 A1* 3/2006 Frisken et al. ................. 385/16
2010/0067900 A1* 3/2010 Ishikawa et al. ................ 398/7

* cited by examiner

FIG. 4A
FIG. 4B
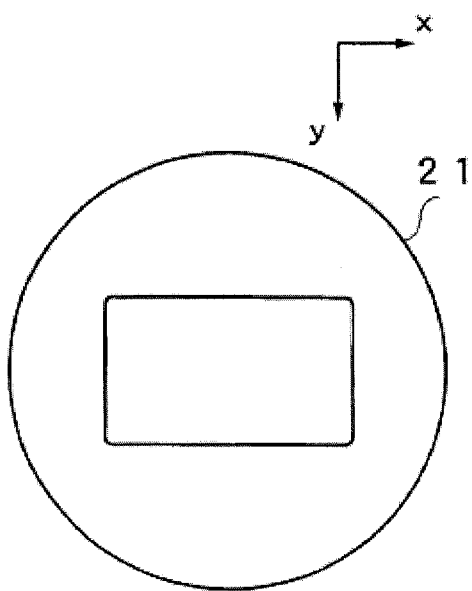
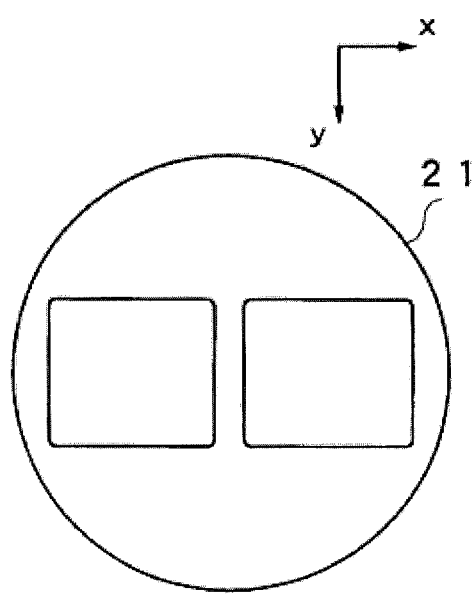

WAVELENGTH SELECTIVE OPTICAL SWITCH HAVING SPECIFIED CHARACTERISTICS OF WDM SIGNAL LIGHT BEAM

TECHNICAL FIELD

The present invention relates to a wavelength selective optical switch that uses liquid crystal elements such as LCOS (liquid crystal on silicon), which is used in the field of optical communications.

BACKGROUND ART

Wavelength division multiplexing optical communications technology is used in the high-speed large-capacity optical networks that support the high level of data communications needed in today's society. There has been progression in the introduction of reconfigurable optical add drop multiplexers (ROADM devices) having reconfigurable add and drop functions at optical nodes, which are equivalent to branches in an optical network. To realize ROADM devices, wavelength selective switches (also called wavelength selective optical switches), which can switch any wavelength in any direction, have gained attention. Light beam deflection elements which select a wavelength and deflect light beams to a desired output port have been used in wavelength selective optical switches, and in Patent References 1 and 2, the diffraction phenomenon by liquid crystal on silicon (LCOS) is used. Furthermore, in Patent References 3 and 4, something which utilizes mechanical displacement of a mirror array of a micro-electro-mechanical system (MEMS) is used.

PATENT REFERENCES

[Patent Reference 1] U.S. Pat. No. 7,787,720 B2
[Patent Reference 1] U.S. Pat. No. 7,397,980 B2
[Patent Reference 1] U.S. Pat. No. 7,162,115 B2
[Patent Reference 1] U.S. Pat. No. 6,707,959 B2

On the other hand, a great deal of research and development has been conducted regarding new modulation formats and increasing of transmission rates to respond to demand for transmission capacity in recent years, and optical networks have become more complex. In such optical networks, it is required that optimal filtering for the transmission rate and modulation format of each optical signal is achieved.

In a ROADM device, an optical signal passes through a plurality of wavelength selective optical switches, but if the edge of the filter waveform of in each individual wavelength selective optical switch is not steep, the passband becomes narrower each time it passes through a wavelength selective optical switch, and the signal cannot be completely reproduced at the receiving terminal. This often occurs in transmission/reception of optical signals at a high transmission rate. Thus, a wavelength selective optical switch having a filter waveform with a steeper edge—that is, a large super-Gaussian coefficient—may be desired.

The propagation function of a wavelength selective optical switch can be expressed by the super-Gaussian function shown below.

$$IL = 10 \cdot \log\left[\exp\left(-\ln 2 \cdot (2 \cdot \Delta v / BW_3)^{2n}\right)\right] \quad (1)$$

Here,
IL: Relative insertion loss (dB)
$\Delta v$: Deviation from filter median frequency
$BW_3$: 3 dB bandwidth
n: Super-Gaussian coefficient.

Here, FIG. 1 is a graph illustrating relative insertion loss versus deviation from the median frequency when the super-Gaussian coefficient n is varied from 1 to 6. In an ordinary waveform selective switch, n is about 3.

In a wavelength selective optical switch, LCOS elements are used as space phase modulation elements, as shown in Patent References 1 and 2. Switching performance of LCOS elements has polarization dependence due to their principle of switching. Therefore, elimination of optical loss due to polarization dependence requires an optical part that converts the polarization of input light to a single desired polarization determined by the structure of the LCOS element.

Thus, when a wavelength dispersion element is polarization-dependent, the optical element must be placed in front of the wavelength dispersion element in order to avoid optical loss due to polarization dependence.

However, when the optical element is placed in front of a condenser lens that constitutes a telecentric optics system, two polarization-split beams are incident at separate positions on the condenser lens, and the incident beam diameter on the condenser lens is restricted to less than half the effective diameter of the condenser lens. Therefore, the value of n ends up being less than half of what it is in the case where the operation of splitting polarization and aligning it in a prescribed direction is not performed, and sharp wavelength selection characteristics are not obtained.

SUMMARY OF THE INVENTION

One or more embodiments of the present invention provide a wavelength selective optical switch that can achieve sharp filter characteristics.

In one aspect, a wavelength selective optical switch according to one or more embodiments comprises a light input/output unit having a plurality of input/output ports; a polarization plane-independent wavelength dispersion element that splits incident light input from the optical input/output unit into spatially different angles for each wavelength, and synthesizes emergent light from different directions and outputs the light to the optical input/output unit; a condenser element that condenses the light split by the wavelength splitting element; a polarization splitter that: splits incident light incident via the condenser element according to a polarization component to result in first and second light beams, aligns a polarization direction by rotating a polarization direction of one of the beams, and synthesizes the incident light by rotating one polarization direction of the emergent light of the same wavelength among the first and second reflected light beams; a space phase modulation element arranged so as to receive incident light deployed on an xy plane made up of an x-axis direction deployed according to wavelength and a y-axis direction orthogonal to the x-axis direction, and having numerous pixels arranged in a lattice on the xy plane, wherein, by changing a phase of a plurality of continuous pixels in the y-axis direction, the space phase modulation element changes refractive index characteristics of those pixels and reflection direction for each wavelength; and a space phase modulation element drive unit that changes phase shift characteristics for each wavelength and reflects light in a different direction for each wavelength by driving electrodes of each pixel arranged in an xy direction of the space phase modulation element.

In one or more embodiments, the incident light applied to the light input/output unit is WDM signal light, and when the physical length in a wavelength dispersion direction per channel of WDM signal light on the face of the space phase modulation element is taken as d and the beam radius in the wavelength dispersion direction per channel is taken as w1, d/w1 is greater than 6.

In one or more embodiments, when the angle dispersion of the wavelength dispersion element is taken as dθ/dυ and the beam radius in the wavelength dispersion direction incident on the condenser element is taken as wf, the product of dθ/dυ and wf is greater than or equal to 0.06 (rad./GHz·μm).

In one or more embodiments, the condenser element is either a condenser lens or a concave mirror.

In one or more embodiments, the space phase modulation element is an LCOS element having numerous pixels arranged two-dimensionally, and the space phase modulation element drive unit controls voltage applied to each pixel according to wavelength selection characteristics.

In one or more embodiments, the polarization splitter comprises: a polarization beam splitter that splits incident light into first and second light beams according to polarization direction, and a wavelength plate that aligns the beams in a polarization direction of one of the split light beams and a polarization direction of the other of the split light beams.

In one or more embodiments, the wavelength dispersion element may be a grism.

According to one or more embodiments of the present invention having such characteristics, the polarization splitter is placed between the condenser element and the space phase modulation element. As a result, the light passing through the condenser element is not light that was split into an s polarization component and a p polarization component, and can pass through in a state which includes all polarization components. For this reason, the width ω1 of the light beam applied to the space phase modulation element can be reduced, the ξ parameter can be increased, and wavelength selection characteristics can be improved.

BRIEF DESCRIPTION OF THE DRAWINGS

FIGS. 4A-B show a drawing illustrating light that passes through a condenser lens of a reflective wavelength selective optical switch according to the second embodiment of the present invention and a comparative example.

DETAILED DESCRIPTION OF THE INVENTION

Figure 1:
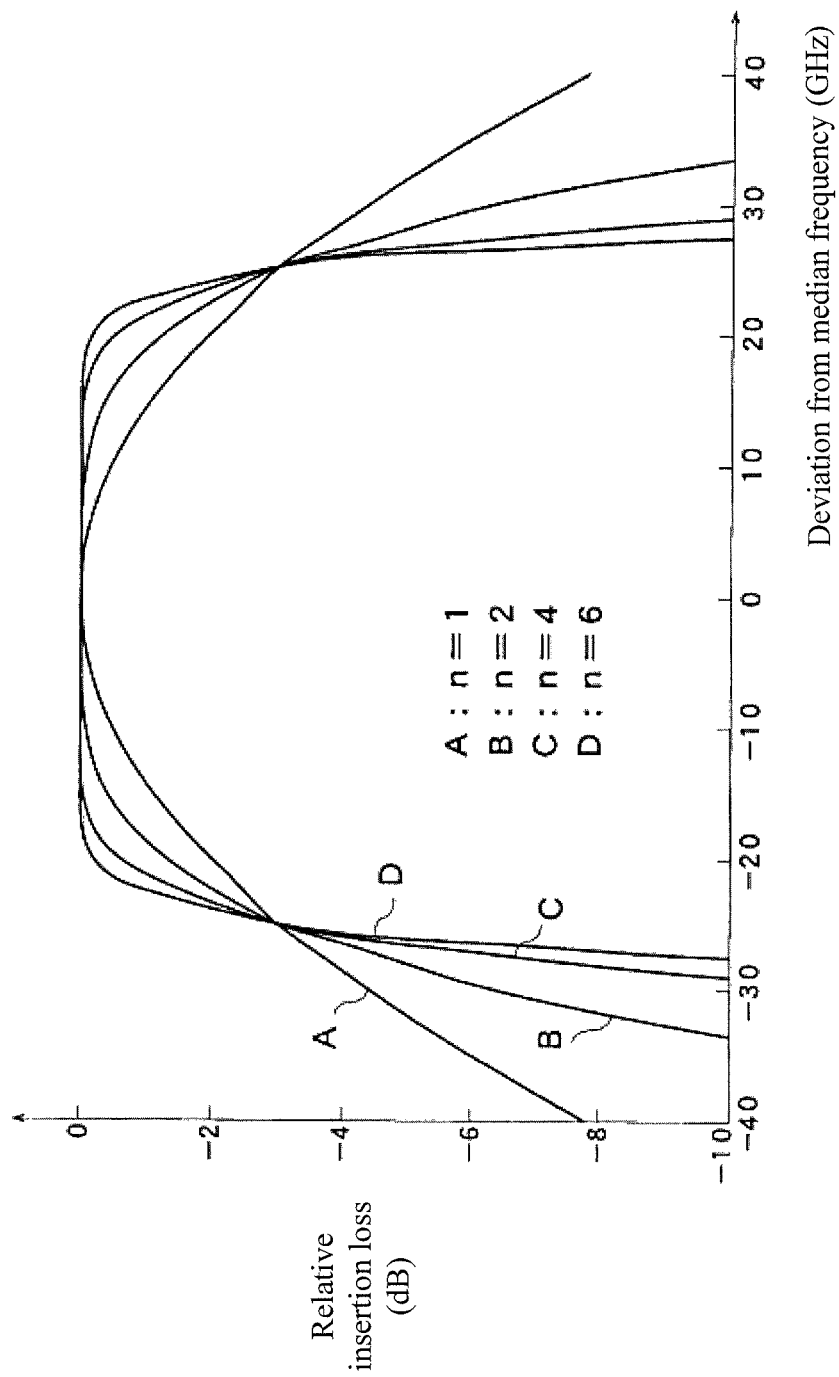
FIG. 1 is a graph illustrating relative insertion loss versus deviation from the median frequency when a super-Gaussian function is varied.
Figure 2:
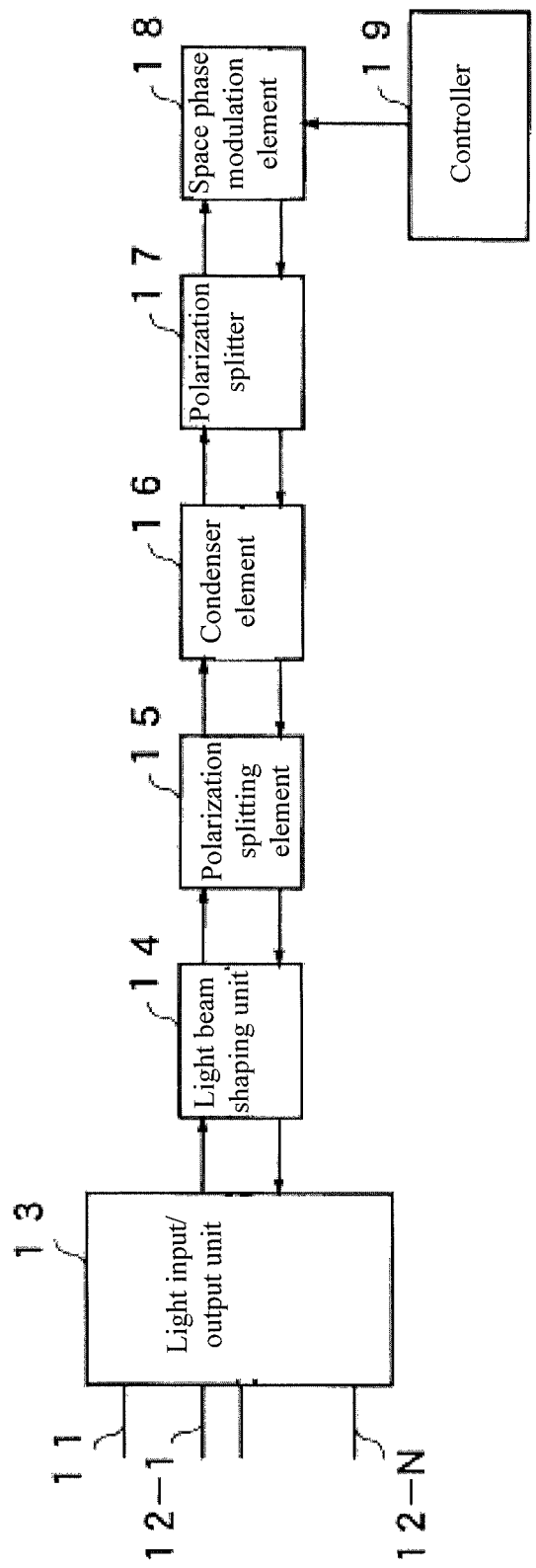
FIG. 2 is a drawing illustrating the constituent elements of a reflective wavelength selective optical switch according to a first embodiment of the present invention.

FIG. 2 is a drawing illustrating the configuration of a wavelength selective optical switch according to a first embodiment of the present invention. As shown in FIG. 2, a wavelength selective optical switch 1 has a light input/output unit 13 to which at least one input port 11 and a plurality of output ports 12-1 through 12-N are connected. The input port 11 and output ports 12-1 through 12-N are constructed from optical fiber. Here, the light signal input to the input port 11 is wavelength division multiplex signal (WDM signal) light in which a plurality of wavelengths from $\lambda_1$ through $\lambda_n$ are multiplexed. The light input/output unit 13 makes this WDM signal light into parallel light using a collimator lens, and outputs emergent light to output ports 12-1 through 12-N via a collimator lens. A light beam shaping unit 14 is provided on the output side of the light input/output unit 13. In adjusting the diameter of the light beam on the face of the space phase modulation element to be described later, the light beam shaping unit 14 shapes the incident beam so as to convert it to an elliptical beam whose beam diameter expands in the light dispersion direction, and converts the emergent light in reverse. A polarization-independent wavelength dispersion element 15 is provided on the output side of the light beam shaping unit 14. This wavelength dispersion element 15 disperses light in different directions according to wavelength, and can be realized by, for example, a polarization-independent diffraction grating or prism. A polarization splitter 17 is provided on the output side of the wavelength dispersion element 15 via a condenser element 16. The condenser element 16 is a condenser element of a telecentric optics system which focuses light on the face of the space phase modulation element such that it becomes mutually parallel at any position. The polarization splitter 17 makes the WDM light into two parallel light beams, and has a polarization beam splitter, which splits the WDM light of the input port into an s polarization component and a p polarization component, and a wavelength plate, which converts the polarization direction of one of the split light beams into the other polarization direction. These two light beams are guided to a space phase modulation element 18. A controller 19 is connected to the space phase modulation element 18. The space phase modulation element 18 is a polarization-dependent element which receives the dispersed light of each wavelength, and changes the direction for each wavelength and reflects it. Then, the reflected light from the space phase modulation element 18 returns to the polarization splitter 17, and one of the polarization directions of the reflected light synthesized by the polarization splitter 17 is rotated and synthesized. The output of the polarization splitter 17 is provided to the wavelength dispersion element 15 via the condenser lens 16, and synthesized. The output of the wavelength dispersion element 15 is output from the output ports 12-1 through 12-N of the light input/output unit 13 via the light beam shaping unit 14. Note that the input port 11 and output ports 12-1 through 12-N are used here, but they can be used such that the input and output are inverted.

Figure 3A:
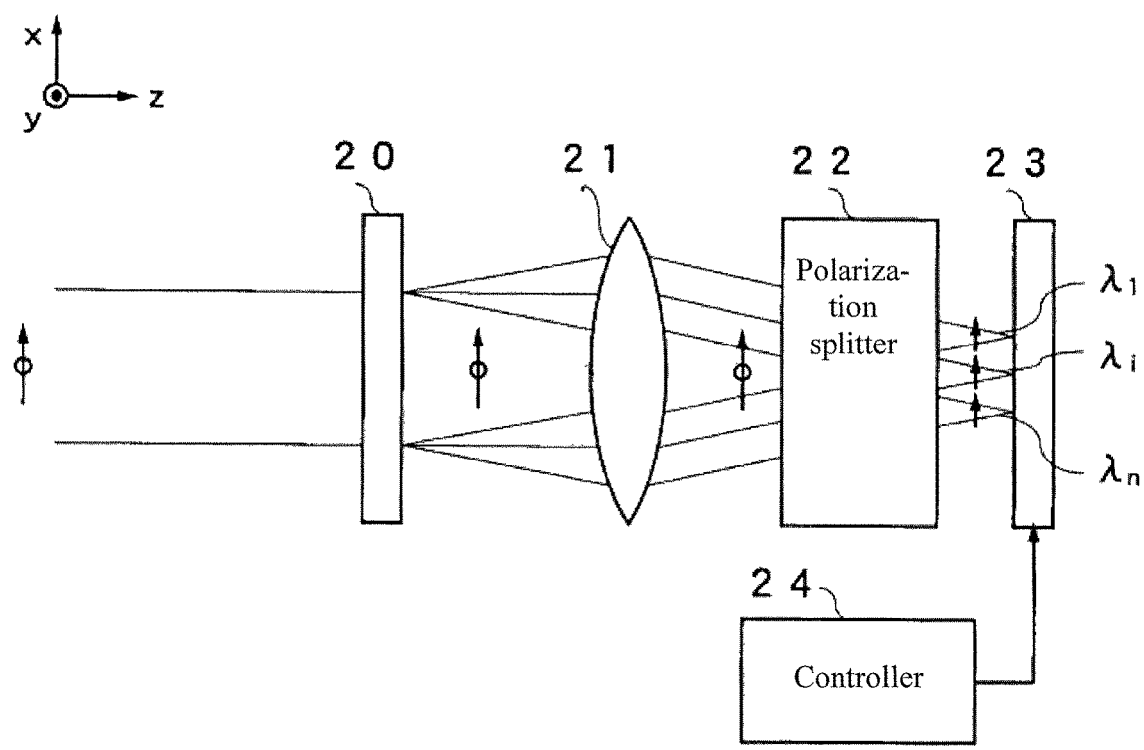
FIG. 3A is a drawing illustrating the optical layout of a reflective wavelength selective optical switch according to a second embodiment of the present invention, seen from the x-axis direction.
Figure 3B:
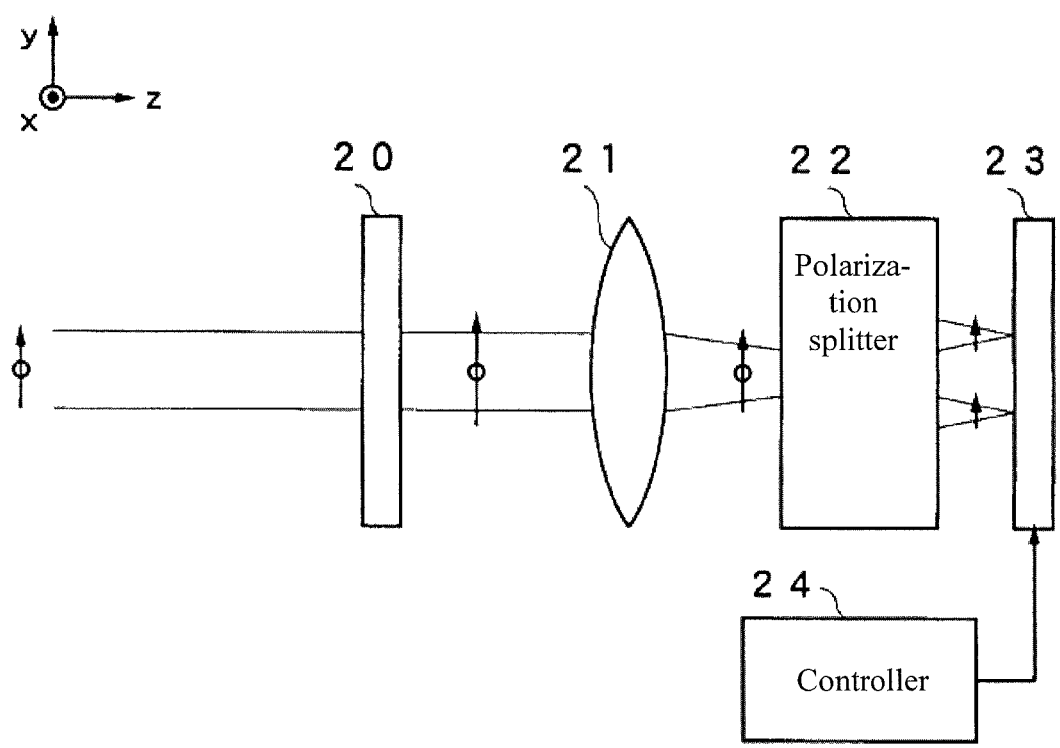
FIG. 3B is a drawing illustrating the optical layout of a reflective wavelength selective optical switch according to a second embodiment of the present invention, seen from the y-axis direction.

Next, a second embodiment which is more specific than the first embodiment will be described. FIG. 3A is a drawing illustrating the layout of optical elements from the light beam shaping unit 14 onward from the y-axis direction according to this embodiment, and FIG. 3B is a drawing illustrating the optical layout from the x-axis direction. The configuration of the input port 11, output ports 12-1 through 12-N and light input/output unit 13 is the same as in the first embodiment. Note that in the drawings described below, p polarization components are indicated by a vertical arrow, and s polarization components are indicated by a circle.

In this embodiment, the wavelength dispersion element 15 is constructed from a wavelength dispersion element 20. The wavelength dispersion element 20 disperses incident light in different directions on the xz plane according to wavelength, and also synthesizes reflected light in different directions on the xz plane according to wavelength. In this embodiment, the wavelength dispersion element 20 is realized by a grism, which is a combination of a diffraction grating and a prism. The light dispersed by the wavelength dispersion element 20 is provided to a condenser lens 21 which is equivalent to the condenser element 16. The condenser lens 21 is a condenser element which condenses light dispersed on the xz plane in the z-axis direction on the face of an LCOS element 23 via a polarization splitter 22.

Note that FIG. 3A illustrates light having a wavelength of a maximum wavelength $\lambda_1$, minimum wavelength $\lambda_n$ and intermediate wavelength but since the incident light is WDM signal light having numerous spectra from $\lambda_1$ to $\lambda_n$, the WDM signal light deployed along the xy plane is applied to the LCOS element 23 in the form of bands. The LCOS element 23 changes the direction of and reflects incident light for each wavelength by control from a controller 24, and the selective characteristics of the wavelength selective optical switch are determined by the reflection characteristics thereof.

FIG. 4(*a*) illustrates light that passes through the condenser lens 21. In the drawing, the region of the rectangle is the region where light passes through. The x axis is the wavelength dispersion direction; the portion dispersed on the y axis on the left edge of the rectangle is the region where light of wavelength $\lambda_1$ passes through, and the portion dispersed on the y axis on the left edge of the right edge is the region where light of wavelength $\lambda_n$ passes through, resulting in a state where wavelength-dispersed light is substantially continuously dispersed in between. For comparison, FIG. 4(*b*) illustrates the case where light obtained by splitting the incident light into two light beams according to polarization direction is incident on the condenser lens. Thus, when an incident beam in the wavelength polarization direction ends up being split in two beforehand, the range in which the condenser lens 31 is used in the wavelength dispersion direction in each beam is narrow.

Figure 5A:
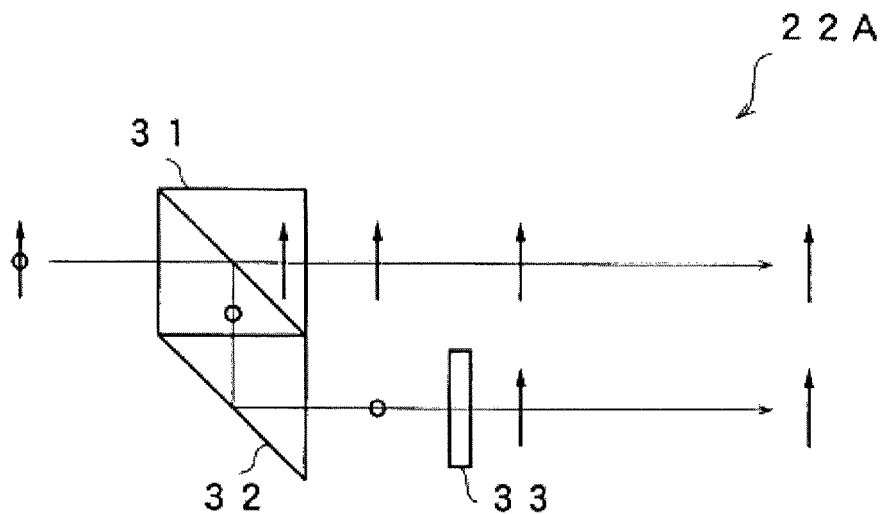
FIG. 5A is a drawing illustrating a first example of a polarization splitter used in the wavelength selective optical switch according to the second embodiment of the present invention.

Next, a specific example of the polarization splitter 22 will be described using FIG. 5A and FIG. 5B. FIG. 5A illustrates a polarization splitter 22A, which is constructed from a polarization beam splitter 31, a prism 32, and a $\lambda/2$ wavelength plate 33. The [missing word] condensed by the condenser lens 21 is incident on the polarization beam splitter 31 of the polarization splitter 22A. The polarization beam splitter 31 allows p polarization to pass through as-is, and reflects light of s polarization components. The light split by the polarization beam splitter 31 is incident on the prism 32. On the output side of the prism 32, the prism 32 reflects light of the s polarization component, causing it to be incident on the $\lambda/2$ wavelength plate 33. The $\lambda/2$ wavelength plate 33 converts light of the s polarization component to p polarization, and can align the polarization direction of the two light beams.

Figure 5B:
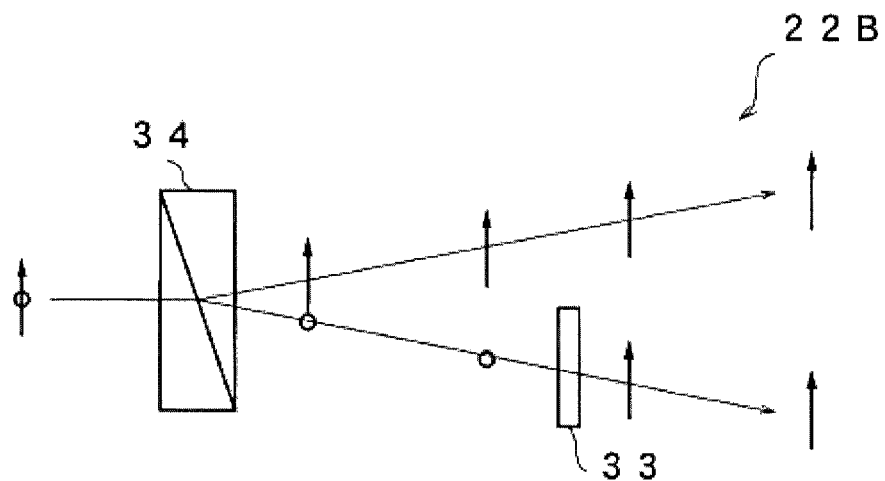
FIG. 5B is a drawing illustrating a second example of a polarization splitter used in the wavelength selective optical switch according to the second embodiment of the present invention.

Next, FIG. 5B is a drawing illustrating another example of the polarization splitter 22. In this polarization splitter 22B, the polarization beam splitter is realized by a Wollaston prism 34, which splits incident light into p polarization and s polarization components. The s polarization components that pass through the Wollaston prism 34 are converted to p polarization components by the $\lambda/2$ wavelength plate 33.

In this embodiment, the space phase modulation element 18 is realized by the LCOS element 23. In the second embodiment, the light applied to the LCOS element 23 is light obtained by developing WDM light on the xy plane according to wavelength band. Here, the LCOS element 23 is an element in which, for example, 1920 pixels in the wavelength dispersion direction (x direction) and 1080 pixels in the direction orthogonal to that (y direction) are arranged in a lattice. In this wavelength selective optical switch, light of any wavelength can be selected by controlling the direction in which it is reflected for each wavelength. The controller determines the reflection direction of light on the xy plane by matching it with a selected wavelength. By driving the electrodes of each pixel arranged in the xy directions in the LCOS element 23, the controller 24 constitutes a space phase modulation element drive unit which controls the characteristics of pixels at a prescribed position in the x-axis and y-axis directions.

Figure 7A:
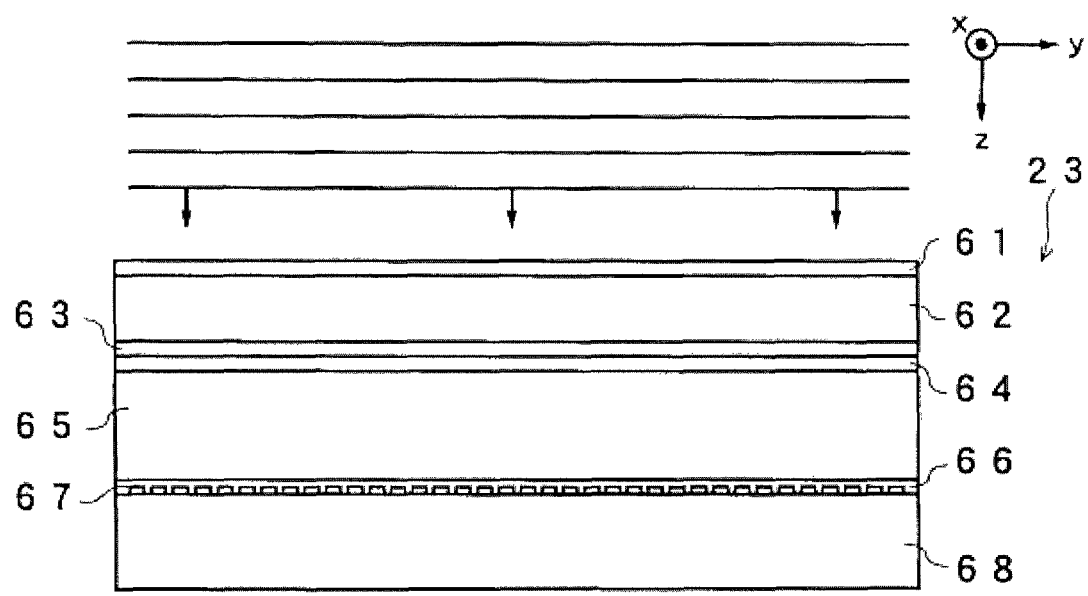
FIG. 7A is a drawing illustrating the structure of a wavelength selective element and input of light to the wavelength selective element of the wavelength selective optical switch according to the first and second embodiments of the present invention.

Next, the detailed configuration of the LCOS element 23 will be described. Since the LCOS element 23 has a liquid crystal modulation driver built into the back of each pixel, the number of pixels can be increased. FIG. 7A is a schematic diagram illustrating the LCOS element 23, which is configured by laminating an AR layer 61, a glass layer 62, a transparent common electrode 63, an alignment layer 64, a liquid crystal layer 65, an alignment layer 66 which contains numerous back face reflection electrodes 67, and a silicon layer 68.

Figure 6:
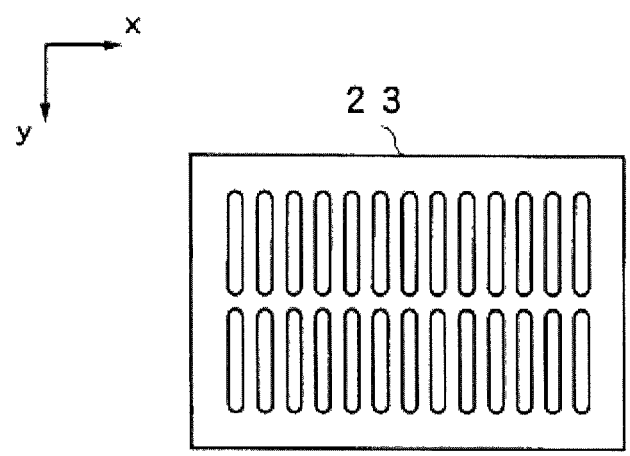
FIG. 6 is a drawing illustrating light that is incident on an LCOS element of the wavelength selective optical switch according to the second embodiment of the present invention.
Figure 7B:
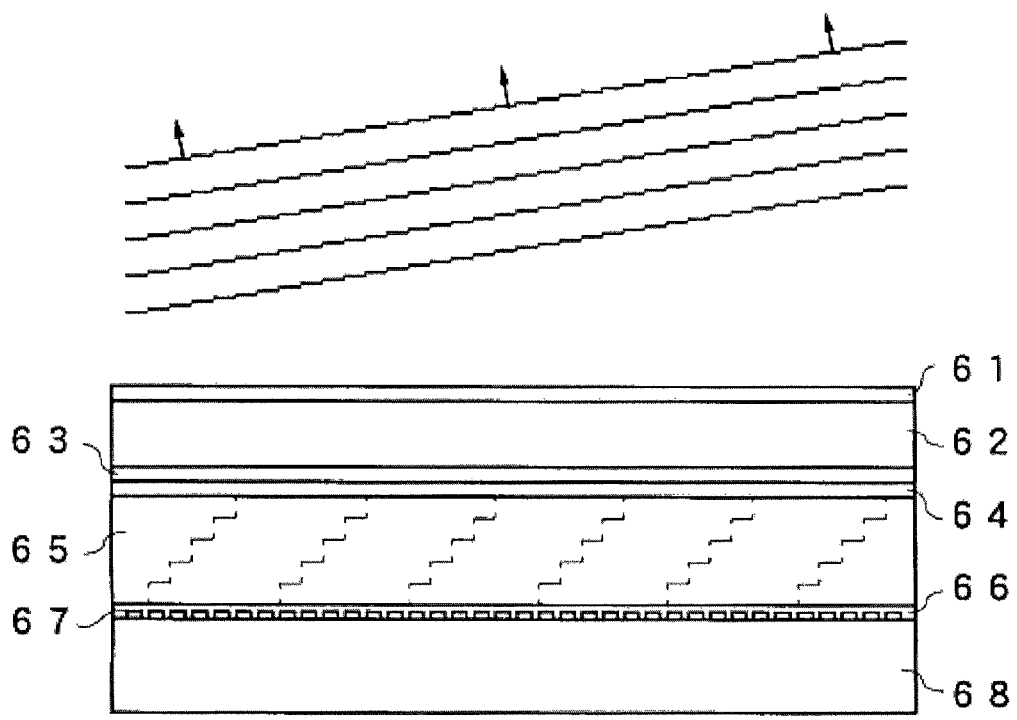
FIG. 7B is a drawing illustrating reflection of light from this wavelength selective element.
Figure 8:
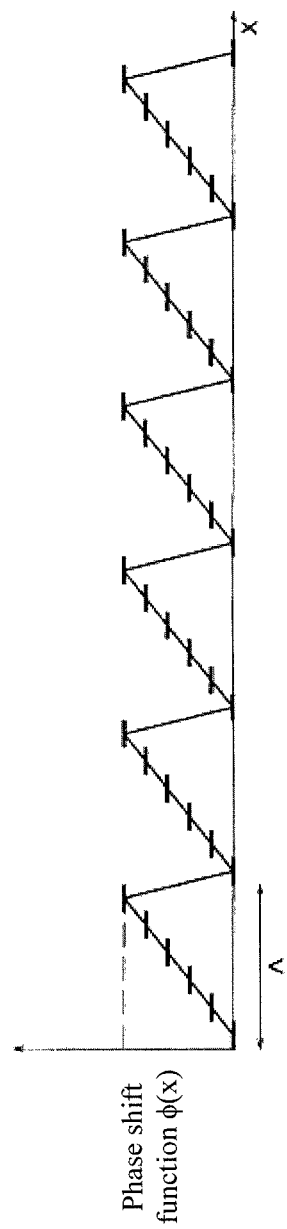
FIG. 8 is a drawing illustrating the relationship between the incidence position of the LCOS element and phase shift according to this embodiment.

The light applied to the incidence region of the LCOS element 23 is light obtained by developing WDM light on the xy plane according to wavelength band $\lambda_i$ (i=1 to n). Here, if the wavelength dispersion direction is taken as the x-axis direction shown in FIG. 6, numerous pixels lined up in the y-axis direction correspond to the respective wavelengths. Thus, by periodically providing a different voltage to the numerous y-direction pixels of the LCOS element 23 on which light of a certain wavelength $\lambda_i$ is incident, the step-like phase shift function shown in FIG. 8 is exhibited, and overall, changes in refractive index resulting in a saw tooth shape can be realized. In FIG. 8, the phase shift quantity is changed in a step-wise manner by a plurality of pixels, in this case six pixels, and by repeating this change periodically, a function similar to a blazed diffraction grating can be realized. Note that in the drawing, the linear saw tooth wave shows the case of a blazed diffraction grating, and the step-like waveform shows the case of an LCOS element having numerous levels. Thus, a multi-level optical phased array can be achieved by changing the refractive index, and the reflection direction can be made to differ, as shown in FIG. 7B, for example, by the diffraction phenomenon. Here, by appropriately selecting the phase shift function, the refraction angle of incident light can be changed to different directions for each wavelength, and therefore, the LCOS element can be thought of as a characteristics variable diffraction grating. Therefore, by applying voltage between the transparent electrode 63 and the back face reflection electrode 67, the diffraction angle of each wavelength component can be independently controlled, and input light of a specified wavelength can be made incident in a desired direction, the light of other wavelength components can be diffracted as unnecessary light, and light in non-emergent directions can be reflected.

The diffraction angle of a multi-level optical phased array is expressed by the following formula (2).

$$\sin\theta_{in}+\sin\theta_{diff}=k\cdot\lambda/\Lambda \quad (2)$$

Here,
q: Number of multi-levels,
k: Diffraction order,
λ: Wavelength,
Λ: Phased array pitch,
$\theta_{in}$: Angle of incidence, and
$\theta_{diff}$: Diffraction angle.

Also, diffraction efficiency η is approximated by formula (3).

$$\eta=(\sin(\pi/q)/(\pi/q))^2 \quad (3)$$

Furthermore, if the pitch of pixels of the LCOS element 23 is taken as p, the following relationship is established between it and the phased array pitch Λ.

$$\Lambda=q\cdot p \quad (4)$$

The ξ parameter expressed by formula (5) is known as a design index of filter shape in a space optics system that uses a diffraction grating and condenser lens.

$$\xi=(\upsilon_{ch}\cdot dx/d\upsilon)/(2w1) \quad (5)$$

Figure 9:
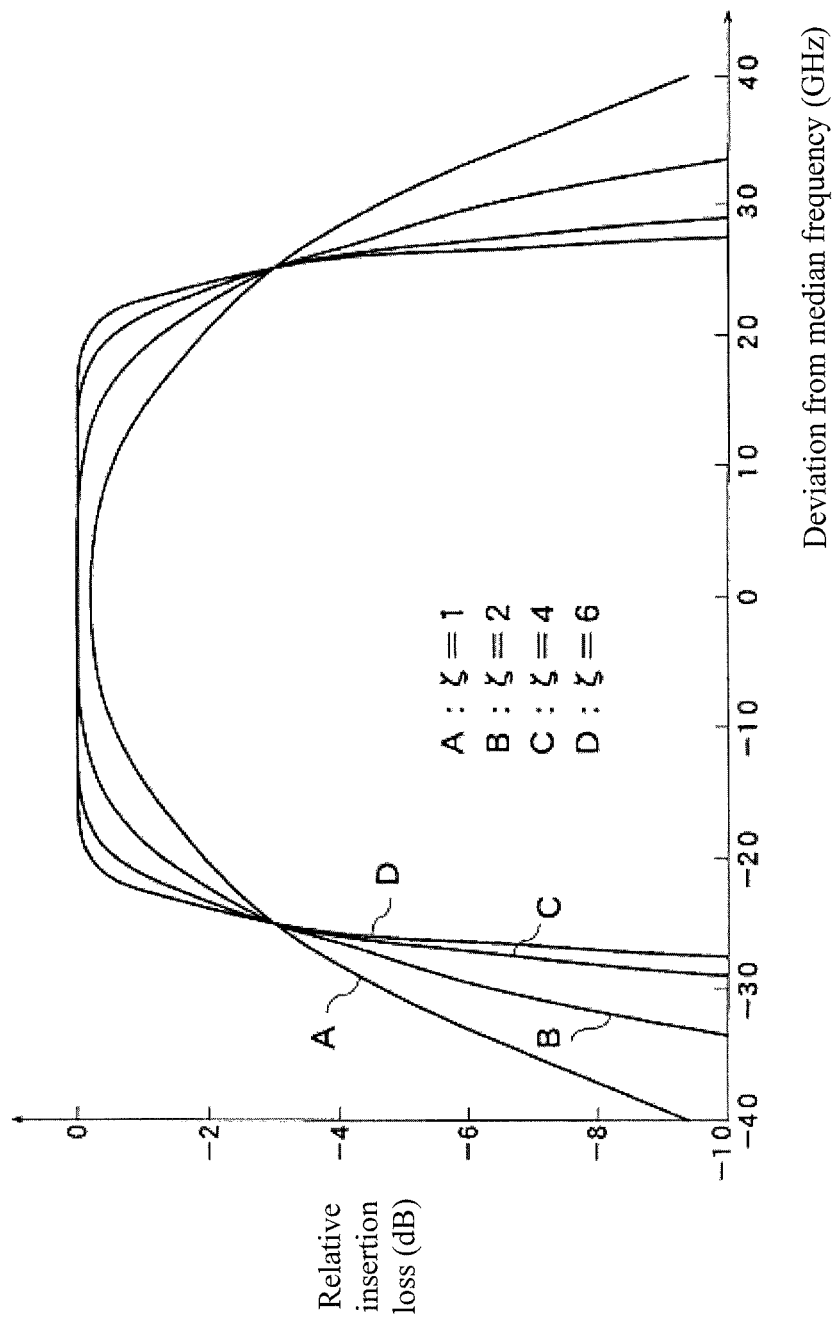
FIG. 9 is a graph illustrating relative insertion loss of the wavelength selective element and relative insertion loss versus deviation from the median frequency according to this embodiment.

Here,
$\upsilon_{ch}$: Interval of channel frequencies of WDM signal,
dx/dυ: Dispersion quantity per unit frequency on LCOS face, and
w1: Gaussian beam radius in wavelength dispersion direction on LCOS face (intensity $1/e^2$). Here, FIG. 9 is a graph showing relative insertion loss according to change in frequency in the case where the ξ parameter is varied. Here, when the ξ parameter is changed between 1 and 6, wavelength selective characteristics are as illustrated, and this can be considered substantially equal to the super-Gaussian coefficient n shown in formula (1). Therefore, by designing the value of ξ of formula (5) to be large, a steeper filter shape can be obtained.

Figure 10:
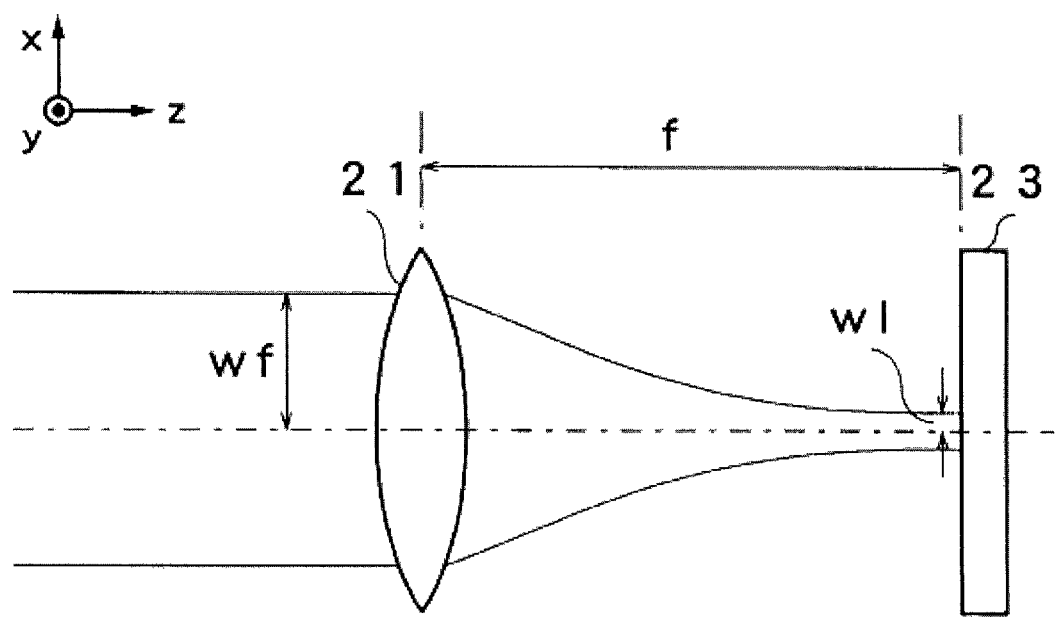
FIG. 10 is a drawing illustrating the diameter of light that passes through the condenser lens and light incident on the LCOS element according to this embodiment.

Additionally, as shown in FIG. 10, if
f: Focal length of condenser lens 21,
wf: Beam radius in wavelength dispersion direction incident on condenser lens 21, and
λ: Wavelength,
then w1 can be approximated by formula (6).

$$w1=(\lambda\cdot f)/(\pi\cdot wf) \quad (6)$$

From formula (5) it is understood that w1 may be designed to be small in order to increase the value of ξ, and from formula (6) it is understood that to achieve this, it is effective to design wf to be large.

Here, the dispersion quantity per unit frequency dx/dυ on the face of the LCOS element 23 is expressed by the following formula (7) using the angle dispersion of the diffraction grating dθ/dυ.

$$dx/d\upsilon=f\cdot d\theta/d\upsilon \quad (7)$$

By substituting formulas (6) and (7) into formula (5), the following formula is obtained.

$$\xi=(\pi\cdot\upsilon_{ch}\cdot d\theta/d\upsilon\cdot wf)/2\cdot\lambda \quad (8)$$

Figure 11:
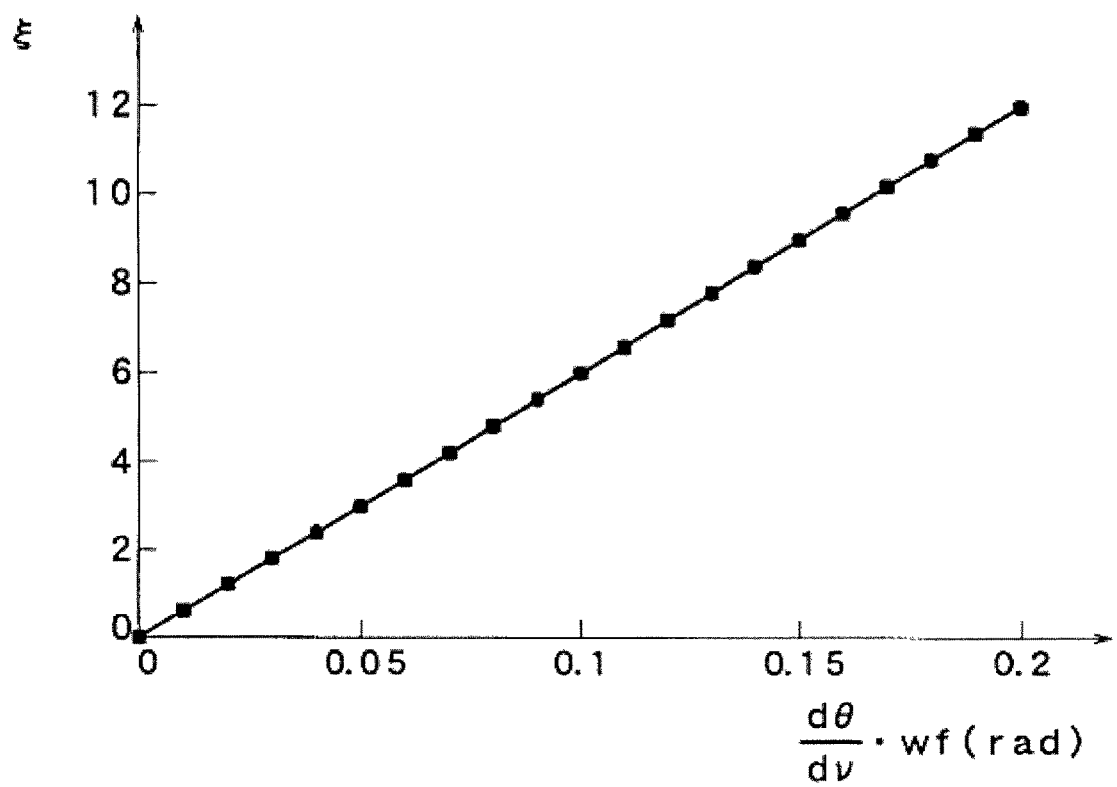
FIG. 11 is a graph illustrating the relationship between the ξ parameter and dθ/dυ·wf.

FIG. 11 is a graph illustrating the relationship between the ξ parameter and dθ/dυ·wf in the case where $\upsilon_{ch}$ is 50 GHz and λ is 1550 nm. Here, if the optics system is arranged such that the product of dθ/dυ and wf is greater than or equal to 0.06 (rad./GHz·μm), then ξ=3.0.

Note that in a conventional wavelength selective optical switch, ξ is generally about 3.0. Here, $\upsilon_{ch}$ is set to 50 GHz because it is the narrowest channel interval in a WDM system, and the narrower the channel interval, the stricter the requirements for the filter waveform. Also, the wavelength is set to 1550 nm because it is the median value of the C band that is widely used in WDM systems, and substantially the same value is obtained with a wavelength between 1520 nm and 1570 nm Therefore, in a generalized ξ parameter, a filter shape that is better than conventional waveforms can be realized by selecting the angle dispersion and the diameter wf of the beam incident on the condenser lens such that dθ/dυ·wf is 0.06 or above.

More generally, if the physical length per channel on the face of the LCOS element 23 is taken as d (=$\upsilon_{ch}\cdot dx/d\upsilon$) and the beam radius per channel on the face of the LCOS element 23 is taken as w1, then the following formula is established.

$$\xi=d/2\cdot w1$$

In one or more embodiments, d/w1 may be set to greater than 6 in order that ξ is greater than 3.

In this embodiment, WDM signal light is used as the input signal, but it is not limited to WDM signal light, and may be applied using light in which numerous wavelengths overlap.

Furthermore, in this embodiment, a condenser lens is used as the condenser element, but it may also be configured using a concave mirror. Also, an LCOS element is used as the space phase modulation element, but the embodiment can also be realized using a MEMS element.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims. According to one or more embodiments of the present invention as described in detail above, a wavelength selective optical switch having sharp filter characteristics can be obtained, which can be advantageously used as

DESCRIPTION OF REFERENCE NUMERALS

11 Input port
12-1 through 12-N Output ports
13 Light input/output unit
14 Light beam shaping unit
15, 20 Wavelength dispersion elements
16 Condenser element
17 Polarization splitter
18 Space phase modulation element
19 Controller
21 Condenser lens
22 Polarization splitter
23 LCOS element
31 Polarization beam splitter
32 Prism
33 λ/2 wavelength plate
34 Wollaston prism

What is claimed is:

1. A wavelength selective optical switch comprising:
a light input/output unit having a plurality of input/output ports;
a polarization plane-independent wavelength dispersion element that splits incident light input from the optical input/output unit into spatially different angles for each wavelength, and synthesizes emergent light from different directions and outputs the light to the optical input/output unit;
a condenser element that condenses the light split by the wavelength splitting element;
a polarization splitter that:
   splits incident light incident via the condenser element according to a polarization component to result in first and second light beams,
   aligns a polarization direction by rotating a polarization direction of one of the beams, and
   synthesizes the incident light by rotating one polarization direction of the emergent light of the same wavelength among first and second reflected light beams;
a space phase modulation element arranged so as to receive incident light deployed on an xy plane made up of an x-axis direction deployed according to wavelength and a y-axis direction orthogonal to the x-axis direction, and having numerous pixels arranged in a lattice on the xy plane, wherein, by changing a phase of a plurality of continuous pixels in the y-axis direction, the space phase modulation element changes refractive index characteristics of those pixels and reflection direction for each wavelength; and
a space phase modulation element drive unit that changes phase shift characteristics for each wavelength and reflects light in a different direction for each wavelength by driving electrodes of each pixel arranged in an xy direction of the space phase modulation element,
wherein the condenser element is a condenser element of a telecentric optics system in which light that reaches the face of the space phase modulation element is focused such that it becomes mutually parallel at any position,
wherein the incident light applied to the light input/output unit is WDM signal light input to an input port of the plurality of input/output ports, and a wavelength selective optical switch that serves as a key constituent element of nodes of WDM light.

wherein, when the physical length in a wavelength dispersion direction per channel of WDM signal light on the face of the space phase modulation element is taken as d and the beam radius in the wavelength dispersion direction per channel is taken as w1, d/w1 is greater than 6.

2. The wavelength selective optical switch according to claim 1, wherein when the angle dispersion of the wavelength dispersion element is taken as $d\theta/d\upsilon$ and the beam radius in the wavelength dispersion direction incident on the condenser element is taken as wf, the product of $d\theta/d\upsilon$ and wf is greater than or equal to 0.06 (rad./GHz·μm).

3. The wavelength selective optical switch according to claim 1, wherein the condenser element is either a condenser lens or a concave mirror.

4. The wavelength selective optical switch according to claim 2, wherein the condenser element is either a condenser lens or a concave mirror.

5. The wavelength selective optical switch according to claim 1, wherein
the space phase modulation element is an LCOS element having numerous pixels arranged two-dimensionally, and
the space phase modulation element drive unit controls voltage applied to each pixel according to wavelength selection characteristics.

6. The wavelength selective optical switch according to claim 2, wherein
the space phase modulation element is an LCOS element having numerous pixels arranged two-dimensionally, and
the space phase modulation element drive unit controls voltage applied to each pixel according to wavelength selection characteristics.

7. The wavelength selective optical switch according to claim 3, wherein
the space phase modulation element is an LCOS element having numerous pixels arranged two-dimensionally, and
the space phase modulation element drive unit controls voltage applied to each pixel according to wavelength selection characteristics.

8. The wavelength selective optical switch according to claim 1, wherein
the polarization splitter comprises:
   a polarization beam splitter that splits incident light into first and second light beams according to polarization direction, and
   a wavelength plate that aligns the beams in a polarization direction of one of the split light beams and a polarization direction of the other of the split light beams.

9. The wavelength selective optical switch according to claim 2, wherein
the polarization splitter comprises:
   a polarization beam splitter that splits incident light into first and second light beams according to polarization direction, and
   a wavelength plate that aligns the beams in a polarization direction of one of the split light beams and a polarization direction of the other of the split light beams.

10. The wavelength selective optical switch according to claim 3, wherein
the polarization splitter comprises:

a polarization beam splitter that splits incident light into first and second light beams according to polarization direction, and a wavelength plate that aligns the beams in a polarization direction of one of the split light beams and a polarization direction of the other of the split light beams.

11. The wavelength selective optical switch according to claim 1, wherein the wavelength dispersion element is a grism.

* * * * *